United States Patent [19]  [11] 4,000,032
Bergstrom et al.  [45] Dec. 28, 1976

[54] PROCESS OF FREEING CELLULOSE FIBERS FROM LIGNOCELLULOSIC MATERIAL BY IRRADIATION

[75] Inventors: John Rickard Bergstrom; Ernst Birger Tiberg, both of Ornskoldsvik, Sweden

[73] Assignee: Mo och Domsjo, Ornskoldsvik, Sweden

[22] Filed: Sept. 23, 1975

[21] Appl. No.: 615,959

[30] Foreign Application Priority Data

Sept. 27, 1974 Sweden ................................ 7412207

[52] U.S. Cl. ..................................... 162/21; 162/22; 162/50; 204/158 R; 219/10.55 M; 241/1
[51] Int. Cl.$^2$ ........................ D21B 1/30; D21C 5/00
[58] Field of Search ................. 162/21, 22, 50, 65; 219/10.55 A, 10.55 R, 10.55 M, 411; 204/158 R, 158 S; 241/1, 2

[56] References Cited

UNITED STATES PATENTS

| | | | |
|---|---|---|---|
| 3,092,536 | 6/1963 | Russell | 162/50 |
| 3,535,795 | 10/1970 | Olsen | 219/10.55 M X |
| 3,678,594 | 7/1972 | Goerz et al. | 219/10.55 A |
| 3,682,643 | 8/1972 | Foster | 219/411 X |
| 3,759,783 | 9/1973 | Samuelson et al. | 162/65 |
| 3,801,432 | 4/1974 | Free | 162/50 |

FOREIGN PATENTS OR APPLICATIONS

| | | | |
|---|---|---|---|
| 454,127 | 1/1949 | Canada | 241/1 |
| 1,162,055 | 8/1969 | United Kingdom | 219/10.55 A |

OTHER PUBLICATIONS

*Physical Chemistry*, Third Edition, Daniels et al., Wiley & Sons Inc., New York, 1967, p. 422.

*Primary Examiner*—S. Leon Bashore
*Assistant Examiner*—Steve Alvo

[57] ABSTRACT

A process is provided for freeing cellulose fibers from lignocellulosic material, which comprises subjecting particulate lignocellulosic material to irradiation at a frequency within the range from about 10 to about 300,000 MHz (megahertz), at an intensity of at least 0.5 megajoule per kg. of material, applied in a short pulse having a duration of at most 0.1 second, at such an intensity the water present in the lignocellulosic material is rapidly and even explosively vaporized, and disrupts or destroys the natural structure of the lignocellulosic material, thereby freeing the fibers substantially without deleterious effect upon the length or strength of the fibers.

12 Claims, No Drawings

PROCESS OF FREEING CELLULOSE FIBERS FROM LIGNOCELLULOSIC MATERIAL BY IRRADIATION

The preparation of cellulose pulp from lignocellulosic material such as wood is a complicated process, involving both chemical and physical phenomena, the objective and result of which is a freeing of the fibers from the natural lignocellulosic structure in which they are retained. The fibers are bound together in the natural structure by lignin, and in order to free the fibers from the natural structure it is necessary to destroy the structure, and the bonds provided by the lignin, in some way, normally by chemical or by physical attack, or both.

The strongest cellulose fibers, i.e. the fibers of cellulose pulps of high strength, are obtained by chemical attack using chemical digestion or pulping techniques. This is probably because the fibers themselves are attacked only chemically, by the pulping chemicals. Thus, they are not appreciably shortened, unless the chemical attack is so severe as to lead to rupture of the cellulose chain. The pulping chemicals are especially selected and the pulping process controlled so as to primarily attack and remove the lignin, thereby loosening the fibers, and forming a fibrous cellulose pulp suspension in the digestion liquor. High temperatures and pressure and relatively long reaction times are normally required, and a substantial degradation of the cellulose fibers may take place, in the course of which they may be greatly weakened, if the digestion conditions are not quite right, or properly controlled. While chemical digestion processes produce the strongest cellulose pulps, they are nonetheless unsatisfactory nowadays, due to the high degree of pollution of the environment with waste chemicals produced as by-products of the process. Moreover, chemical digestion processes are notoriously difficult to control in a manner to obtain a uniform pulp having a given target Kappa number. Control of the digestion process is so extremely complex that this alone has occupied the attention of the cellulose pulp industry for many years, and it is only in recent years that good control has seemed to be within reach.

A further problem of chemical digestion processes is the low yield. A large proportion of the lignocellulosic material is lost by dissolution in the disgestion liquor, partly as a result of degradation of the cellulose molecule to soluble by-products. Nowadays, with the high cost and relative scarcity of lignocellulosic material, particularly wood, it is desirable to improve the yield, and especially to do so while reducing pollution of the environment. It seems unlikely, however, that this will be achieved in an ideal manner in a chemical digestion process.

It is also possible to free the cellulose fibers from the lignocellulosic material by physical attack, referred to as mechanical defibration, refining or grinding. For example, the lignocellulosic material can be ground mechanically in a grinder, or defibrated in a disc mill, or in a screw defibrator, after which the partially defibrated material is refined in a suitable refining apparatus. These are only some of the various ways for applying by mechanical means a sufficient physical stress to the lignocellulosic material so that the fiber bonds are loosened, and the fibers freed. However, the mechanical stress is not really selective, and invariably the pulp fibers are cut and shortened. Because of their short fiber length, mechanical pulps usually have a low strength, as compared to chemical pulps.

However, mechanical defibration processes also have disadvantages. The lignocellulosic material is tough, and resistant to the mechanical attack, as a result of which a large amount of energy must be applied through the machinery, with resulting wear and tear, and only a small fraction of the energy applied is actually utilized for freeing the fibers. Even so, mechanical defibration is quite attractive from the standpoint of yield, because there is no loss of lignocellulosic material by dissolution in a digestion liquor, and since the application of energy is purely mechanical, there are no contaminating by-product chemicals to be disposed of.

In order to overcome the disadvantages of each process, chemical pulps have frequently been blended with mechanical pulps. With the same objectives, a combined process has also been used, combining on the same material a partial chemical digestion or pulping with a partial defibration by application of mechanical force. The resulting yield of cellulose pulp is higher than when a chemical digestion is applied, while the resulting pulp is stronger than a pulp obtained by mechanical defibration alone. However, the properties are only averaged out, at best, and such a process requires both mechanical defibration equipment and chemical pulping equipment, which increases the capital plant outlay, and maintenance cost.

U.S. Pat. No. 1,578,609, patented Mar. 30, 1926 to William H. Mason, provides a rather poor quality pulp suitable only for the preparation of chipboard or masonite sheet material. The process has come to be known as the masonite process, and the fiberboard obtained from such pulp as masonite. The pulp is obtained by subjecting particulate lignocellulosic material to external heating at rather elevated temperatures, of the order of 180° to 290° C, and a high pressure of approximately 275 to 600 lbs/sq.in. for up to two minutes, after which the pressure is rapidly reduced. The reduction in pressure at this elevated temperature results in rapid vaporization of the water in the lignocellulosic material, and the expanding steam virtually explodes the natural lignocellulosic structure, with the result that the fibers are freed. However, at such temperatures the lignin is also softened or melted, and so the free fibers are coated with plastic lignin, which reduces the attractive forces between the fibers to such an extent that the resulting cellulose pulp is suitble only for the manufacture of chipboard or masonite. Moreover, because of the relatively long heating time at high temperatures and pressures, the lignin-coated fibrous material is quite discolored, and this color is not susceptible of improvement in a conventioanl bleaching process.

In accordance with the invention, a process is provided for freeing the fibers of particulate lignocellulosic material under conditions similar to but without the disadvantages of the masonite process. In accordance with the invention, the energy required to vaporize the water contained in the lignocellulosic material is applied not by thermal external heating but by way of microwave or radio wave radiation, at a frequency within the range from about 10 to about 300,000 MHz. The applied energy is concentrated within the lignocellulosic structure at such an intensity that the water is vaporized before the lignocellulosic material is heated appreciably, so that the lignin does not coat the fibers that are thereby freed. It is not even necessary to apply the energy at a high pressure, which is then released, to obtain the water vaporization. Moreover, the fibers are not shortened, nor are they damaged to the same extent as in the masonite process because they do not reach such high temperatures. It is generally observed that not more than 40% and frequently not more than 20% of the fibers are ruptured or shortened in the course of the process of the invention.

The process of the invention is applicable to any kind of lignocellulosic material, such as bagasse, plant material, and especially wood. In general, hardwood such as beech and oak is more costly than softwood, such as spruce and pine, but both types of wood can be processed satisfactorily using this process. Exemplary hardwoods which can be processed include birch, beech, poplar, cherry, sycamore, hickory, ash, oak, chestnut, aspen, maple, alder and eucalyptus. Exemplary hardwoods include spruce, fir, pine, cedar, juniper and hemlock.

In the process of the invention, mixtures of two or more softwoods and hardwoods, of two or more hardwoods, and of two or more softwoods, can be processed to form cellulose pulps of superior papermaking properites.

In the case of wood, it is preferred that the material be in the form of small pieces. Subdivision of the wood into chip form can be done in a chipper, which shoud provide chips having a size within the range from about 5 to 30 mm by from about 10 to 40 mm, with a thickness of from about 0.5 to about 10 mm. The use of thin chips having a thickness from about 0.5 to about 5 mm is particularly suitable, since this facilitates the penetration of the microwave or radio wave radiation into the interior of the lignocellulosic material.

In order to provide a sufficient volume of water vapor to obtain an adequate disruption of the lignocellulosic material structure, the lignocellulosic material should have a water content of at least about 10% up to about 99%, calculated by weight of the total weight of the lignocellulosic material and the water. The normal takeup limit of water of most lignocellulosic materials at atmospheric pressure is 50% by weight, as thus calculated. More can be absorbed if the material is subjected to a vacuum, and then immersed in water, but it is not necessary that the amount of water exceed twice the weight of lignocellulosic material. Quite satisfactory results are obtained when the water content is within the range from about 25 to about 95% by weight. It is generally preferred that the water content be within the range from about 50 to about 90% by weight.

The radiation should have a frequency within the range of microwaves or radio waves, from about 10 to about 300,000 MHz. Quite satisfactory results are obtained by application of radiation having a frequency within the range from about 200 to about 50,000 MHz, and preferably the radiation has a frequency within the range from about 800 to about 15,000 MHz.

The radiation is applied to the particles in one quite short pulse, having a duration of at the most 0.1 second, and preferably 0.01 second or less. A single brief pulse is sufficient to vaporize the water without unduly heating up the lignocellulosic material, and especially the fibers.

In principle, the particles of lignocellulosic material (which may have been impregnated with water) are irradiated with microwave or radio wave energy in one short pulse having such high energy that the particles are exploded, after which the particles are removed from the irradiation chamber and a new batch of particles is introduced into the irradiation chamber, irradiated, exploded, and carried away. Thus, each particle is irradiated with one pulse of microwave or radio wave energy only. The time interval between the microwave or radio wave pulses is the time it takes to remove the exploded fibers away from the irradiation chamber, plus the time required to introduce a new batch of particles, i.e. $0.1 \times 10^{-4}$ second.

Thus, the irradiation can be carried out batchwise, on successive batches of particles, or the particles continuously passed through the irradiation zone, with the transport time of particles through the irradiation zone equal to the intervals between pulses, and vice versa, so that the particles in the zone are irradiated only once Any type of generator of microwave and/or radio wave radiation can be used. Such generators are well known, and form no part of the instant invention. The microwave generator used in the Example is of the KLYSTRON-type, having a maximum continuous effect of 50kW. The microwave generator is equipped with a pulsing aggregate so that the klystron can give pulses of 0.001 second and an effect of 5MW. The maximum effect of the microwave generator depends on the energy output per second so that when the generator is pulsed it can give pulses of much higher intensity than the continuous intensity. The intensity of the pulse should be at least 0.5 MJ (megajoule) per kilogram of lignocellulosic material.

Application of microwave and/or radio wave radiation in one short pulse has the further advantage that the heat energy consumed in the process of the invention is considerably less than that consumed in conventional mechanical defibration processes, and better cellulose pulps are obtained, besides. Consequently, the energy consumption costs are rather low, in proportion to other such processes. Moreover, the process in accordance with the invention provides a higher pulp yield than do chemical pulping methods, and a higher pulp strength than do mechanical defibration methods.

Because of the high intensity of heat resulting from application of the energy, the process in accordance with the invention can be carried out at atmospheric pressure. It is not necessary to use elevated pressure, followed by quick reductions in pressure, as in the masonite process. However, if desired, superatmospheric and subatmospheric pressures also can be used. In some cases, it may be desirable to employ a subatmospheric pressure to increase the disruptive or disintegrating effect on structures of the steam generated within the lignocellulosic material.

The process of the invention can also be applied to lignocellulosic material which has been partially mechanically defibrated, as well as to lignocellulosic material that has been partially pulped or digested chemically. In either case, it is important to adjust the water content, if necessary, prior to application of microwave and/or radio wave radiation in accordance with the invention, so as to obtain the desired fiber freeing effect.

The mechanism by which the process of the invention actually frees the fibers from the particulate lignocellulosic material has not as yet been established. From a comparison of the appearance and properites of the cellulose fibers that are obtained with the fibers obtained in the masonite process, it is suggested that the water present in the lignocellulosic material rapidly absorbs the microwave and/or radio wave radiation, thereby becoming heated to and exceeding the boiling point, and vaporizing rapidly to form steam. The steam is unable to diffuse out rapidly enough through the structure of the lignocellulosic material, because of the speed of its formation, with the result that the structure is disrupted, or disintegrated, or even explosively destroyed, so that the lignocellulosic structure is broken apart. The hot steam may also soften the lignin which binds the materials together in the structure. Lignin has a softening point within the range from about 120° to about 200° C, depending upon its composition and the lignocellulosic structure in which it is found. When it is softened, the bond strength is weakened, and the fibers are easier to separate from the structure. However, the disruption takes place so rapidly that the fibers themselves are not heated sufficiently to soften the material within the fibers, as a result of which the fibers are not shortened, but merely freed. This explains why the fibrous pulp retains a high strength.

If desired, the particulate lignocellulosic material can be heated prior to application of microwave and/or radio wave radiation in accordance with the invention. This of course reduces the amount of radiation required to bring the water content thereof to the vaporization temperature.

The following Example in the opinion of the inventors represents a preferred embodiment of their invention.

EXAMPLE

Spruce chips 7 mm by 15 mm and 1 mm thick, having a moisture content of 60 to 70% by weight, were separated into three batches, which were then treated by three different methods to form cellulose pulp.

Batch 1 was subjected to chemical digestion, using the sulfate digestion method.

Batch 2 was defibrated by a thermomechanical process, in which 10 kg of pine chips per minute was treated with steam for four minutes at a temperature of 100° C and ground at a pressure of 0.32 MPa in a disc mill, to which 475 kilowatts of power was supplied.

Batch 3 was treated in accordance with the invention. First, it was separated into ten portions, each weighing 5 g, with a moisture content of 70% by weight. Each portion was then heated to 100° C, and treated in a wave guide connected to a pulsed microwave generator of the klystron type having a medium power output of 50 kilowatts at a frequency of 2450 MHz. Each batch was subjected to microwave radiation in short pulses of 0.001 second having an effect of 5MW.

Each of the cellulose pulps obtained from Batches 1, 2, and 3 were formed into laboratory sheets, and the paper quality of the sheets was then compared, with the following results:

|  | Batch 1 Chemical pulp | Batch 2 Thermo-mechanical pulp | Batch 3 Pulp according to the invention |
|---|---|---|---|
| Breaking length, km | 12 | 3 | 6 |
| Yield, % | 46 | 96 | 96 |
| Energy requirement, megajoules/kg pulp | 5.6 | 10.8 | 6.6 |

-continued

|  | Batch 1 Chemical pulp | Batch 2 Thermo-mechanical pulp | Batch 3 Pulp according to the invention |
|---|---|---|---|
| Freeness, ml CSF | 325 | 150 | 150 |

It is apparent from the above data that the pulp produced by the process of the invention was equal in yield to the thermomechanical pulp, and had twice the tear length, meaning that it was twice as strong. The energy required to reduce the particulate lignocellulosic material to pulp was approximately 60% that required to produce the thermomechanical pulp, and the freeness was the same.

The improvement as compared to the chemical pulp is also apparent. Although the pulp in accordance with the invention was half as strong, the yield was twice that of the chemical pulp, and the energy requirements rather comparable.

Having regard to the foregoing disclosure, the following is claimed as the inventive and patentable embodiments thereof:

1. A process for freeing cellulose fibers of particulate lignocellulosic material which comprises supplying the energy required to vaporize water contained in lignocellulosic material by subjecting particulate lignocellulosic material having a water content of at least 10% by weight to irradiation at a frequency within the range from about 10 to about 300,000 MHz, at an intensity of at least 0.5 megajoule per kg of material, applied in a short pulse having a duration of at most 0.1 second, sufficient to vaporize the water and disintegrate the lignocellulosic structure to an extent to free the cellulose fibers.

2. A process according to claim 1, which comprises heating the lignocellulosic material to a temperature of at least 70° C prior to irradiation.

3. A process according to claim 1, in which the lignocellulosic material is wood.

4. A process according to claim 3, in which the wood is in the form of chips having a size within the range from about 5 to 30 mm by from about 10 to 40 mm, with a thickness of from about 0.5 to about 10 mm.

5. A process according to claim 1, in which the lignocellulosic material has a water content within the range from about 10 to about 99% by weight.

6. A process according to claim 5, in which the lignocellulosic material has a water content within the range from about 50 to about 90% by weight.

7. A process according to claim 1, in which the radiation has a frequency within the range from about 200 to about 50,000 MHz.

8. A process according to claim 7, in which the radiation has a frequency within the range from about 800 to about 15,000 MHz.

9. A process according to claim 1, which comprises applying the radiation while the lignocellulosic material is under a superatmospheric gas pressure which is then released.

10. A process according to claim 1, which comprises applying the radiation while the lignocellulosic material is under a subatmospheric gas pressure.

11. A process according to claim 1, in which the lignocellulosic material has been partially mechanically defibrated, prior to application of the radiation.

12. A process according to claim 1, in which the lignocellulosic material has been partially pulped chemically, prior to application of the radiation.

* * * * *